(12) United States Patent
Bawa et al.

(10) Patent No.: US 6,356,564 B1
(45) Date of Patent: Mar. 12, 2002

(54) USE OF BOOKING FACTORS TO REDEFINE AVAILABLE BANDWIDTH

(75) Inventors: Satvinder Singh Bawa, Ottawa; Bruce Brown, Rockland; Mike Holloway, Stittsville, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/063,788

(22) Filed: Apr. 22, 1998

(51) Int. Cl.[7] .................................................. H04J 15/00
(52) U.S. Cl. ......................................... 370/468; 370/254
(58) Field of Search ................................ 370/468, 395, 370/389, 401, 351, 352, 216, 218, 229, 228, 230, 231, 232, 233, 234, 235, 237, 238, 252, 254; 379/221; 340/825.01, 825.03, 827

(56) References Cited

U.S. PATENT DOCUMENTS

| | | | |
|---|---|---|---|
| 5,210,740 A | * | 5/1993 | Anzai et al. ................. 370/251 |
| 5,790,546 A | * | 8/1998 | Dobbins et al. ............. 370/400 |
| 5,856,981 A | * | 1/1999 | Voelker ....................... 370/468 |
| 6,038,212 A | * | 3/2000 | Galand et al. ............... 370/216 |
| 6,084,855 A | * | 7/2000 | Soirinsuo et al. ............ 370/235 |
| 6,112,085 A | * | 8/2000 | Garner et al. ................ 455/428 |

* cited by examiner

*Primary Examiner*—Dang Ton
(74) *Attorney, Agent, or Firm*—Marks & Clerk

(57) ABSTRACT

A method of assigning effective bandwidth to a physical or logical link for propagating multiple virtual paths through a switched digital communications network is described. Switching nodes within the network have more than one interconnecting link in order to provide redundancy in the event of link failure. The effective bandwidth is assigned to each link according to dual multipliers or booking factors. The first booking factor is used for provisioning the link on set up and the second booking factor is for re-routing in the event of link failure.

17 Claims, 2 Drawing Sheets

USE OF BOOKING FACTORS TO REDEFINE AVAILABLE BANDWIDTH

FIELD OF THE INVENTION

This invention relates to switched digital communications networks for transporting data traffic between end points via paths multiplexed unto physical or logical links interconnecting switching elements in the network architecture and more particularly to the use of dual, bandwidth related booking factors, one for assigning effective bandwidth values to the initial provisioning and the second for path re-routing in the event of a link failure.

BACKGROUND

Packet and cell switching networks such as Frame Relay (FR) and Asynchronous Transfer Mode (ATM) are employed extensively in high speed, broadband applications such as voice, video and data transmissions. In packet and cell switching networks, particularly networks delivering real time, variable rate traffic such as voice and video, factors relating to the burstiness of data in paths or logical links imply that the provisioning of paths may use statistical multiplexing gains. Statistical multiplexing gain is using a physical link for provisioning a number of paths whose aggregate peak rate is greater than the bandwidth of the given physical link. In other words, the probability of all paths carrying traffic at peak cell rate (PCR) for ATM or excess information rate (EIR) for frame relay at the same time is low. This implies that the effective bandwidth of a physical or logical link can be different from the actual bandwidth of these links.

The effective bandwidth of the physical or logical links is arbitrarily calculated using a user supplied number called the booking factor (BF) for these links. The effective bandwidth (EBW) for the purpose of provisioning is calculated as the product of the booking factor and the bandwidth of the associated physical or logical link—link bandwidth (LBW).

For the sake of link redundancy, networks typically make provisions for the availability of multiple possible links for a path to choose from. This allows for the re-route of a path from a failed link to an alternate link between switching elements. To avoid loss of data traffic, however, the alternate route must have sufficient available bandwidth to carry traffic from the failed link as well as the traffic previously assigned to it.

There is, accordingly, a need to provide a system and method for optimizing utilization of bandwidth on a link carrying multi-path traffic while insuring adequate bandwidth on the link for redundancy purposes.

SUMMARY OF THE INVENTION

It is an object of the present invention to provide a system and a method for assigning both provisioning and re-routing bandwidth to either a logical or a physical link carrying multi-path data traffic.

According to the invention the provisioning and re-routing bandwidth is based on dual, user selected, booking factors, one for provisioning and one for re-routing.

Therefore in accordance with a first aspect of the invention there is provided in a switched digital communications network having a plurality of network switching elements for multiplexing multiple data paths over links connecting the switching elements, a method of ensuring redundant paths for the data comprising: assigning a first bandwidth booking factor to each link for provisioning traffic; assigning a second bandwidth booking factor to each link for re-routing traffic; and providing a re-route pending flag (RPF) for marking each affected path in the event of a link failure wherein the first booking factor is employed in the absence of a RPF and said second booking factor is employed while a RPF is present.

In accordance with a second aspect of the invention there is provided in a switched digital communications network having a network management system and a plurality of network elements for multiplexing data paths over links interconnecting the elements, a system for optimizing shared use of the links by the switching elements while providing redundancy in the event of failure of one of the links, the system comprising: provisioning means for assigning a first booking factor for use in calculating an effective bandwidth for provisioning the links; re-routing means for assigning a second booking factor for use in calculating an effective bandwidth for the links for use in re-routing data traffic in the event of a link failure; detection means for detecting a link failure and reporting the failure to the network management system; a re-route pending flag for marking each path affected by a link failure; and means to apply the second booking factor to the system upon detection of the re-route pending flag.

BRIEF DESCRIPTION OF THE DRAWINGS

The invention will now be described in greater detail with reference to the attached drawings wherein.

DETAILED DESCRIPTION OF THE INVENTION

Figure 1:
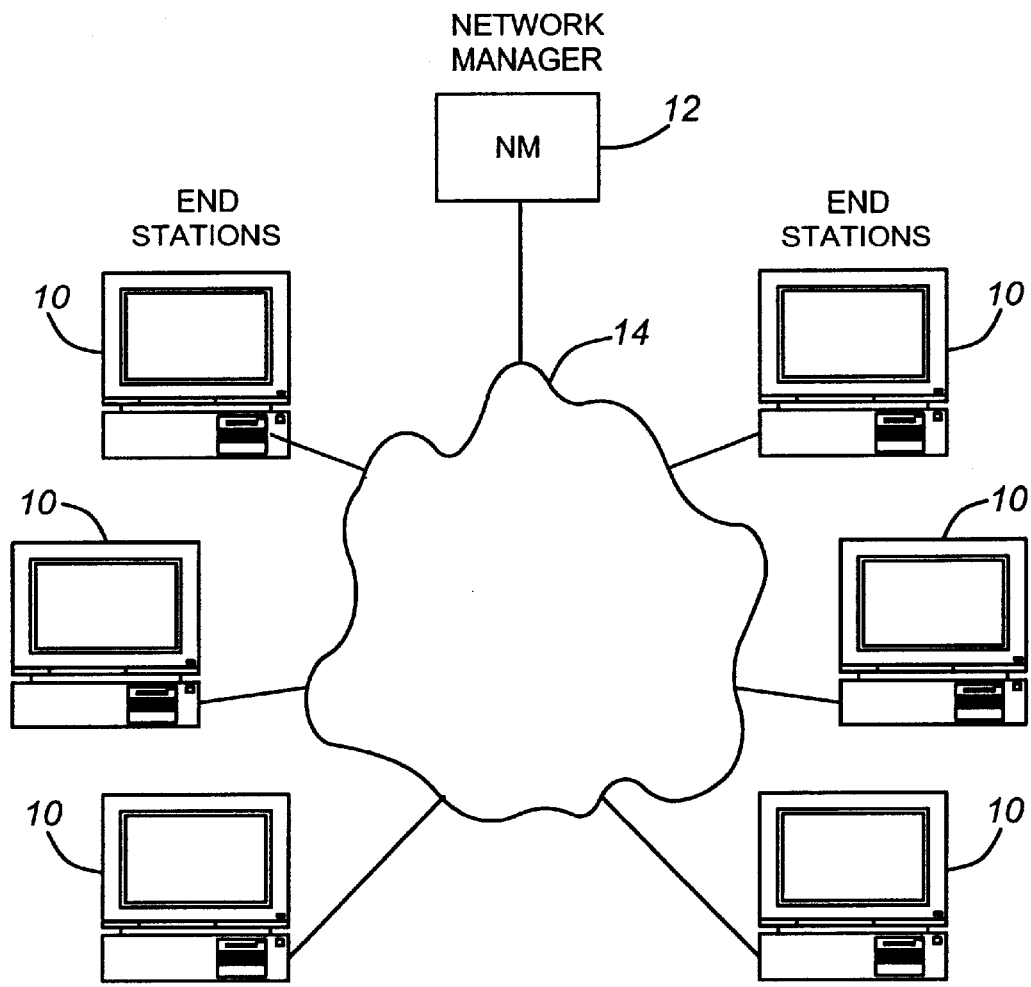
FIG. 1 is a high level illustration of a switched network.
Figure 2:
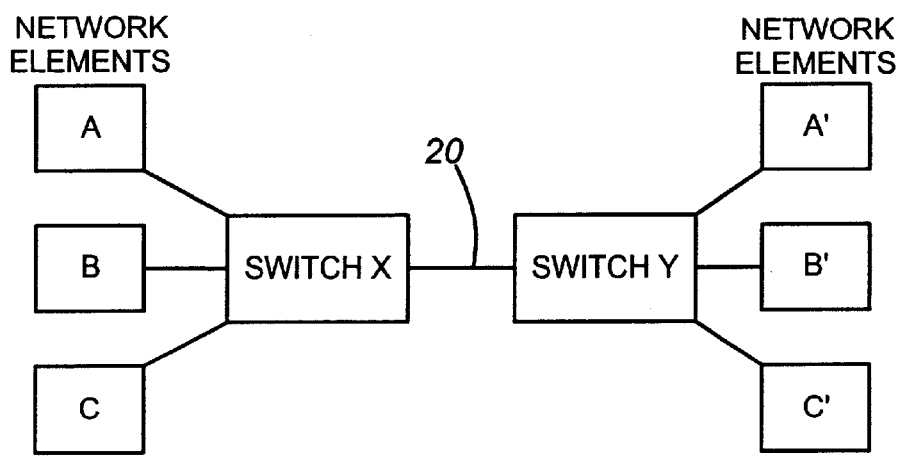
FIG. 2 illustrates statistical multiplexing of multiple paths onto a link.

FIG. 1 shows a high level illustration of one example of a switched digital network of the type to which the present invention applies. As shown, end stations 10 interface with the network 14 to provide end to end communications therebetween. Network switching elements, such as switches X and Y in FIG. 2, are interconnected by physical or logical links in a manner which permits the network manager 12 to provision virtual paths for transporting data between selected end stations 10. In the following description the term link is meant to include both physical and logical links. A physical link is the actual physical level interconnection between nodes while a logical link or virtual circuit represents bandwidth available on one or more physical links providing the data path. A logical link may include one or more intervening nodes.

Statistical multiplexing is used to allow links, such as link 20 in FIG. 2, to carry multiple path traffic. As shown in FIG. 2, traffic from network elements A, B and C are multiplexed by switch X on to link 20 and de-multiplexed by switch Y for delivery to network elements A', B' and C' respectively, thus creating paths A–A', B–B' and C–C'.

Figure 3:
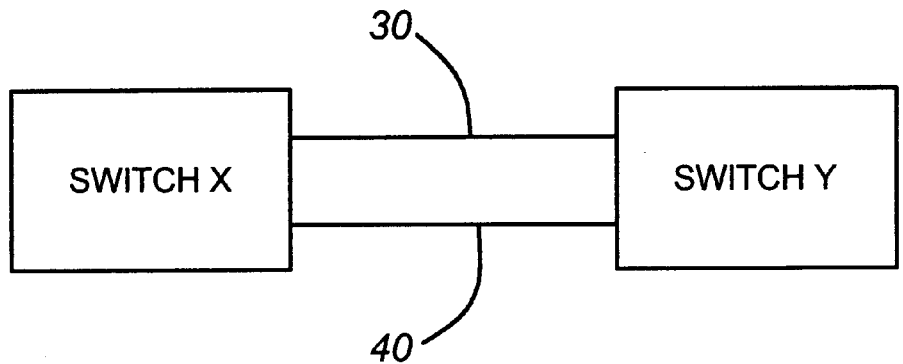
FIG. 3 shows redundancy links.

In order to provide redundancy to the network, switching network elements X and Y will conventionally be provided with dual links 30, 40 as shown in FIG. 3. A network operator will route enough paths over Link 30 and Link 40 such that both of these Links are utilized up to fifty percent of their respective effective bandwidths. However, the availability of a single booking factor, and hence effective bandwidth implies that the network operator can inadvertently utilize links Link 30 and Link 40, to an extent greater than fifty percent of their respective effective bandwidths. This will result in unavailability of redundancy in case of a single link failure. That is, if one of the links, Link 30, or Link 40 were to fail, the working link will not have enough left over effective bandwidth to allow for re-routing of all the paths effected by the first link failure. A method which allows for specification of two different notions of effective bandwidth for the same link, one in the context of provisioning, and another in the context of re-routing, can help eliminate such errors. In this solution, once the bandwidth of a link has been used up in the context of provisioning, the remainder of the bandwidth can be used only in the context of re-routes.

The basis of this invention is that physical and logical links can have two user defined booking factors, namely a provisioning booking factor, and a re-route booking factor. These two booking factors give two different notions of effective bandwidth for an associated link. The effective bandwidth in the context of provisioning is the product of the provisioning booking factor and the link bandwidth. The effective bandwidth in the context of re-routes is the product of the re-route booking factor, and the link bandwidth.

Whenever a path is affected as a result of a link failure, an associated flag (called re-route pending flag, or RPF) is set to mark the fact that the path is awaiting a re-route. When a new route search is being performed for this path, the availability of bandwidth on a link is determined using the following algorithm:

if RPF is set for path,
        then effective bandwidth of link=
            re-route booking factor*bandwidth of link
        else effective bandwidth of link=
            provisioning booking factor*bandwidth of link The RPF of a path is not cleared until the path finds a new route.

Figure 4:
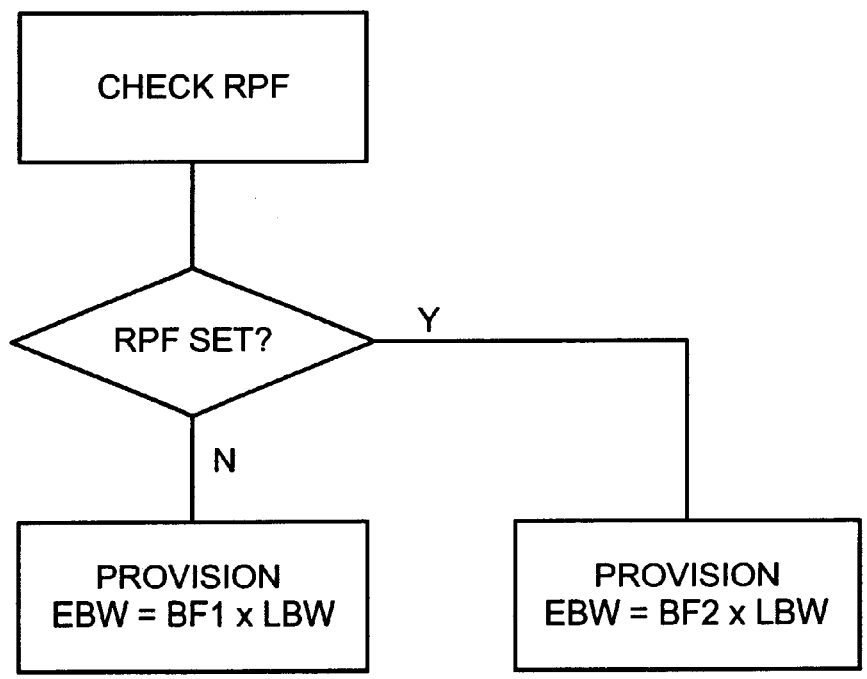
FIG. 4 is a flow diagram of the re-routing algorithm.

FIG. 4 is a flow diagram of the above algorithm. For the sake of this description it is to be assumed that there are two links between each switch and that the bandwidth capacity of each is equal. In FIG. 4 the re-route pending flag (RPF) detector is monitored for flag set mode. If the flag is not set i.e., no link failure, the effective bandwidth (EBW) of each link is set to be the product of the first or provisioning booking factor (BF1) and the bandwidth capacity or link bandwidth (LBW). This booking factor will preferably be no more than 50% of the bandwidth capacity of each link. Taking into account the aforementioned statistical multiplexing factor the effective bandwidth may in reality be more than 50%. If the flag is set indicating a link failure the second or re-routing booking factor (BF2) is used. In this situation the effective bandwidth for the re-routing function is the product of the second booking factor and the bandwidth capacity. Preferably this will be no more than 100% of the bandwidth capacity. In this way the bandwidth requirements of both the failed link and the requirements of the alternate link can still be accommodated.

An example of this solution follows:

Consider FIG. 3 once again. Let us assume that Link 30 and Link 40 are links of equal bandwidth capacity of 10 Mbs ( Mega Bits per Second ). Furthermore, let us assume that the provisioning booking factor of Link 30 and Link 40 is set to 50%, and the re-route booking factor of these links is set to 100%. This setup implies that we have an effective bandwidth of 10 Mbs (50% of Link 30+50% of Link 40) between Switch X and Switch Y. Now lets say that this entire bandwidth is occupied by paths (5 Mbs on Link 30, and 5 Mbs on Link 40). Let us assume that Link 40 fails. In this event, the network management software examines Link 30, and determines that the effective bandwidth of Link 30 is equal to 10 Mbs as RPF is set for paths effected by Link 40 failure. Thus we have the required 5 Mbs bandwidth to successfully re-route all effected paths over Link 30.

The Network Management system (e.g. a Newbridge Network Mainstreet 46020) allows a network administrator to specify first and second booking factors associated with individual Frame relay and ATM links within the network. The 46020 applies the first booking factor to initial provisioning of paths across the network, and the second booking factor will apply during path routing calculations which are occurring during a 46020 re-route. The network administrator can specify a low first booking factor value (e.g., set to a less than full utilization level for provisioning) to achieve a more even distribution of paths over the links by the 46020, before the links become fully utilized. However, in the event of a path re-route by the 46020, a higher second booking factor for links is desirable to achieve a higher number of successful re-routes. The second booking factor allows the links to be utilized more highly in order to accommodate the paths being re-routed off of a failed link.

In the foregoing example two links between switching nodes are provided. It is to be understood, however, that the invention is not limited to this configuration as more than two links may be provisioned for re-routing purposes. In this case the re-routing booking factor is assigned according to the following formula:

$$BF2 = \frac{BF1 \times N}{N - 1}$$

Where N=number of links the path may ride.

While particular embodiments of the invention have been described and illustrated it will be apparent to one skilled in the art that numerous changes can be introduced without departing from the spirit of the invention. It is intended that such changes, to the extent possible, will fall within the scope of the invention as defined by the appended claims.

What is claimed is:

1. In a switched digital communications network having a plurality of network switching elements for multiplexing multiple data paths over links connecting said switching elements, a method of ensuring redundant paths for said multiple data paths comprising:

assigning a first bandwidth booking factor to each link for provisioning traffic;

assigning a second bandwidth booking factor to each link for use in re-routing traffic;

providing a re-route pending flag (RPF) for marking each path requiring a re-route in the event of a link failure; and applying said second booking factor only when said RPF is deployed.

2. A method as defined in claim 1 wherein said communications network is an asynchronous transfer mode (ATM) network for switching cell traffic.

3. A method as defined in claim 1 wherein said communications network is a frame relay (FR) network for switching packet traffic.

4. A method as defined in claim 1 wherein each of said switching elements is connected by two or more logical links.

5. A method as defined in claim 1 wherein each of said switching elements is connected by two or more physical links.

6. A method as defined in claim 1 wherein said first and second booking factors are implemented by a network management system.

7. A method as defined in claim 6 wherein said booking factors are assigned by a network manager operator.

8. A method as defined in claim 4 wherein said first booking factor is used for provisioning said links on connection set up and said second booking factor is used for connection rerouting in the event of a failure of one of said links.

9. A method as defined in claim 8 wherein said second booking factor is assigned in accordance with the formula $$BF2 = \frac{N \times BF1}{N-1}$$

where

N is number of links

BF1 is first booking factor and

BF2 is second booking factor.

10. In a switched digital communications network having a network management system and a plurality of network elements for multiplexing data paths over links interconnecting said elements, a system for optimizing shared use of said links by said switching elements while providing redundancy in the event of failure of one of said links, said system comprising:

provisioning means for assigning a first booking factor for use in calculating an effective bandwidth for provisioning said links;

re-routing means for assigning a second booking factor for use in calculating an effective bandwidth for said links for use in re-routing data traffic in the event of a link failure;

detection means for detecting a link failure and reporting said failure to said network management system;

a re-route pending flag for marking each path affected by a link failure; and means to apply said second booking factor to said system only upon detection of said re-route pending flag.

11. A system as defined in claim 10 wherein said network elements are interconnected by one or more physical links.

12. A system as defined in claim 10 wherein said network elements are interconnected by one or more logical links.

13. A method of optimizing bandwidth allocation to shared links used to carry multiple-path data traffic between network elements in a switched digital communications network, said method comprising: assigning, with a network manager, first and second bandwidth related booking values to said shared links, said first bandwidth related booking value for provisioning initial paths only and said second bandwidth related booking value for use in re-routing paths in the event of a link failure.

14. A method as defined in claim 13 wherein said shared links are physical links.

15. A method as defined in claim 13 wherein said shared links are logical links.

16. A method as defined in claim 13 wherein said first booking value is no more than 50% of bandwidth capacity of the shared link.

17. A method as defined in claim 16 wherein said second booking value is no more than the bandwidth capacity of said shared link.

* * * * *